Feb. 25, 1969  W. C. BELK  3,429,257
FRUIT PROCESSING APPARATUS
Filed March 28, 1966
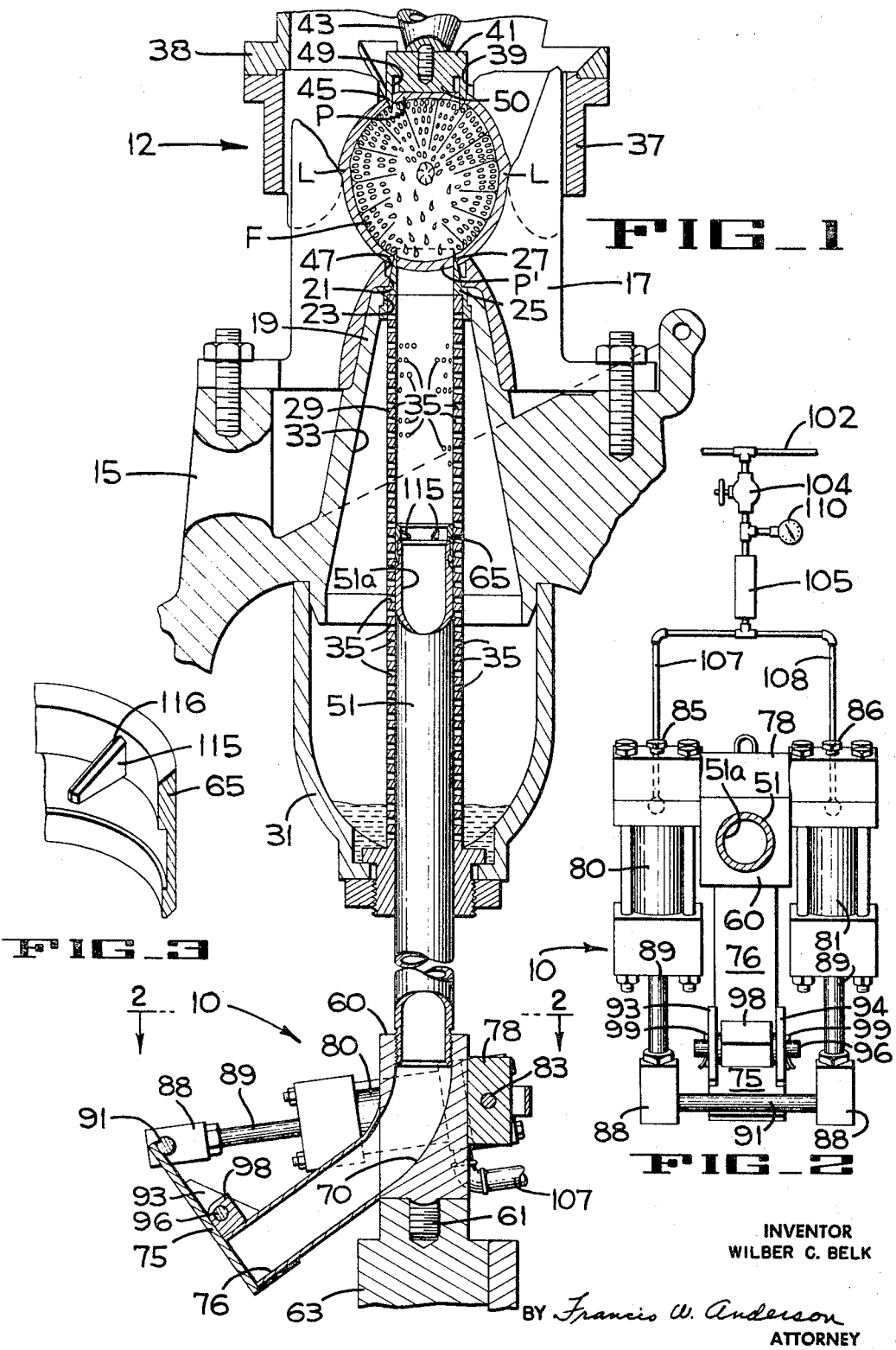
INVENTOR
WILBER C. BELK
BY Francis W. Anderson
ATTORNEY

3,429,257
FRUIT PROCESSING APPARATUS
Wilber C. Belk, Lakeland, Fla., assignor to FMC Corporation, San Jose, Calif., a corporation of Delaware
Filed Mar. 28, 1966, Ser. No. 537,820
U.S. Cl. 100—213                                11 Claims
Int. Cl. B30b 9/02

This invention relates to fruit processing apparatus and, more particularly, it concerns an improved mechanism for applying pressure to fruit to squeeze the juice therefrom.

In apparatus now being used for removing juice from fruit, such as citrus fruit, pressure is applied to all sides of the fruit to compress it and, when the fruit is partially collapsed, finishing pressure is applied by means of a tubular plunger to further squeeze the juice-bearing material and force juice therefrom. The efficiency of the juice extracting operation depends to a large extent on the amount of finishing pressure applied; the greater the pressure, the more complete the juicing operation. In machines now in use, the amount of finishing pressure varies with the type of fruit being processed, that is, fruit with a large number of seeds and the like causes high finishing pressures while seedless fruit results is relatively low finishing pressures. It is, of course, desirable that a single, most efficient finishing pressure be used for each type of fruit being processed. Accordingly, an object of the present invention is to provide means for maintaining a desired finishing pressure on fruit as it is being compressed in a juice-extracting operation.

Another object is to provide means for adjusting the amount of finishing pressure.

Another object is to provide an improved pressure control system for a juice-extracting apparatus.

Other and further features, objects and advantages of the present invention will be apparent from the following description taken in connection with the accompanying drawings, in which:

FIGURE 1 is a vertical central section taken through a juice extracting mechanism that includes a pressure control mechanism constructed in accordance with the teaching of the present invention.

FIGURE 2 is a horizontal section taken along line 2—2 of FIG. 1.

FIGURE 3 is a fragmentary perspective of a portion of the plunger shown in FIG. 1.

The embodiment of the compound mechanism 10 of the present invention chosen for illustration is shown in FIGURE 1 associated with a citrus fruit juice extractor 12 of the type disclosed in the United States patent to Belk et al. No. 2,856,846. However, it should be understood that the present control mechanism may be readily adapted for use with other types of juice extracting apparatus and that the disclosed installation is exemplary only. Since the present invention does not concern the entire machine 12, only those portions of the machine 12 that are necessary for a complete understanding of the present invention will be described, it being understood that, for further data concerning any part of the machine not specifically described herein, reference may be had to said patent which is incorporated by reference herein.

In general, the juice extractor 12 comprises a bedplate 15 having a stationary, fruit-receiving, digitated lower cup 17 seated in an upwardly open position on a hollow, frusto-conical portion 19 of the bedplate. The cup 17 and frusto-conical portion 19 are provided with axially disposed vertically aligned apertures 21 and 23, respectively, which receive a tubular knife 25 having an annular blade 27 that extends upwardly beyond the aperture 21 and into the cavity of the cup 17. The knife 25 is supported on the upper end of a cylindrical strainer tube 29 secured in an upwardly extending position in the bottom of a juice collecting sump 31. The upper portion of the sump 31 is sealed to the lower end of a downwardly flaring juice conduit 33 formed in the bedplate 15. The wall of the strainer tube 29 is provided with a multiplicity of small perforations 35 from the upper end thereof to a point below the lower end of the juice conduit 33.

In vertical alignment with the stationary digitated lower cup 17, and disposed directly thereabove, is an inverted, digitated upper cup 37 rigidly mounted on a vertically reciprocable head 38 for movement into and out of inter-digitation with the stationary cup 17. The cup 37 is provided axially with an aperture 39 into which a cutter assembly 41 protrudes supported on a tapered post 43 formed integral with a head 38. The cutter assembly 41 has a downwardly directed circular blade 45 that is in vertical alignment with an annular recess 47 formed in the stationary cup 17 around the tubular knife 25. In the lower most position of the vertically movable head 38, the circular cutter blade 45 extends down into the recess 47, and the annular blade 27 projects upwardly into an annular recess 49, defined by the cutter blade 45 and by a cylindrical boss 50 internally concentric therewith.

The straining tube 29 slidably receives the free upper end of a cylindrical plunger or orifice tube 51 which is threaded at its lower end into a housing 60 that is part of the control mechanism of the present invention. The housing 60 has a depended threaded stud 61 that is disposed in a tapped socket in a vertically-reciprocable crosshead 63.

In operation, with the upper reciprocating cup 37 in its raised position (not shown) and the plunger 51 in its lowered position (also not shown), a citrus fruit F (FIG. 1) is fed into the stationary lower cup 17 of the juice extractor 12. The cup 37 and plunger 51 are then moved toward the fruit resting in the cup 17 and, when the cup 37 reaches a position slightly above that shown in FIG. 1, the fruit F is firmly gripped by both cups 17 and 37 which apply a substantially uniform pressure to the fruit at all points of contact therewith. At this time, the blade 45 punches a plug P out of the top surface of the fruit F, and the blade 27 cuts a similar plug P' from the lower end of the fruit F. While the cup 37 continues its downward movement toward cup 17, the lower plug P' of the fruit is forced downwardly into the strainer tube 29 with the juice, pulp and seeds of the fruit following it, as the fruit is more and more compressed between the cups. The plug P' eventually comes to rest on a plug which was cut from the upper portion of the immediately preceding fruit during the continuous operation of the machine and is now positioned just within the upper end of a split sleeve 65, that is removably mounted on the upper end of the plunger 51 by the engagement of an annular, inwardly projecting flange on the ring with an annular groove provided in the upper end of the plunger. During this phase in the operation of the machine, the plug at the upper end of the tubular plunger 51 is prevented from moving through the passage 51a of the plunger 51 by the tightly compressed extraction residues of a large number of previously processed fruit. These compressed residues of the previously processed fruit within the passage 51a consist of the plugs cut by the knife blades 27 and 45, the expressed fruit pulp, and the seeds of the previously treated fruit. During the above described initial stage of juice extraction, the outwardly sloping wall of the blade 45 directs the fruit peel L upwardly into the aperture 39 through which eventually the entire peel, with the exception of the plugs P and P' and the pulp and seeds, will pass.

As the juice, pulp and seeds of the fruit F (FIG. 1) are pressed into the straining tube 29 by the lowering of the inverted cup 37, the plunger 51 moves upwardly, reducing the effective volume of the strainer tube 29 and forcing the fruit juice out through the perforations 35 into the juice conduit 33 leading to the juice collecting sump 31, thus separating the juice of the fruit F from its seeds and pulp. At this time, the lower plug P′ is forced down inside the sleeve 65 by the extraction pressure within the tube 29 and, as the plunger 51 continues its upward movement, the seeds and pulp of the fruit F are also pressed into the sleeve. As this extraction residue is forced into the sleeve 65, the plugs and the residue therebetween from previously processed fruit within the sleeve are forced downwardly into a curved discharge passage 70 in the housing 60. By the time the upper end of the plunger 51 passes the uppermost perforation in the strainer tube 29, substantially all the juice of the fruit F has been separated from its pulp and seeds. When the cup 37 reaches its lowermost position, wherein the cups 17 and 37 are fully interdigitated, the boss 50 pushes the upper plug P inside the upper end of the split sleeve 65 as the sleeve moves upwardly. About the time that the plug P enters the sleeve 65, the peel L is completely extruded from between the cups 17 and 37 through the aperture 39. Subsequently, the cup 37 and the plunger 51 move apart, and the cup 37 rises out of interdigitation with the cup 17, so that the latter may receive another fruit, while the plunger 51 descends with the extraction residue to position itself for the beginning of the operation of extracting juice from the next fruit.

It will be evident that the amount of pressure exerted by the plunger 51 as it moves upwardly in the strainer tube will depend upon the amount of fruit residue in the central passage 51a of the plunger and upon the force that is holding the residue in the plunger. In accordance with the present invention, this force is kept at a constant value by positioning a gate 75 at the lower end of a tube 76, that has a central opening forming an extension of the curved discharge passage 70 of the housing 60, and by providing constant pressure means for resisting the opening of the gate to permit discharge of the residue from the plunger.

The housing 60 has the discharge tube 76 welded on one face and a mounting block 78 welded on the opposite face. Two air cylinders 80 and 81 are pivotally mounted on the block 78 by means of a pin 83 that extends through aligned openings in the two air cylinders and in the block 78. Capscrews 85 and 86 are threaded into the cylinders 80 and 81, respectively, to engage the pin 83 and lock the cylinders to the pin which is rotatable in the opening in the block 78.

A small block 88 is threaded on the outer end of each piston rod 89 of the two air cylinders, and a transverse rod 91, that is welded to the gate 75, has end portions snugly engaged in each small block 88. The gate 75 has a pair of flanges 93 and 94, and a hinge pin 96, that extends through aligned openings in the flanges and in a post 98 welded to the tube 76, pivotally mounts the gate on the tube. Cotter pins 99 maintain the hinge pin 96 in place.

As schematically indicated in FIGURE 2, air under pressure in a supply line 102 is directed through a manually adjustable pressure regulator 104 and a surge-chamber 105, and is directed into the air cylinders 80 and 81 by one-half inch branch conduits 107 and 108. A pressure gauge 110 indicates the pressure in the air cylinders which is acting on the pistons to urge the piston rods outwardly of the cylinders 80 and 81 and to thereby resist the opening movement of the gate. It will be evident that, since the resistance pressure against which the gate must open can be varied quickly by adjusting the pressure regulator 104, any desired back pressure can be obtained. The pressure may vary from 30–70 p.s.i.g. depending upon the degree of finishing desired, and the size of the plunger. It has been found that a one inch tube having a $13/16$ inch bore will require half as much pressure as a 1¼ inch tube having a $1 1/16$ inch bore.

It is to be noted in FIGURES 1 and 3 that the split ring 65 has three equi-spaced arms 115 integrally formed on its inner surface and positioned to extend radially inwardly from the inner wall of the ring. Each arm 115 has a sharpened upper edge 116 (FIG. 3) and a flat lower surface. Accordingly, material that is forced downwardly into plunger can move easily in a downward direction—but the flat lower surfaces of the arms prevent the upward movement of the fruit particles in the tube.

From the foregoing discussion it will be evident that, at a certain interval during the squeezing of the fruit in the opposed cups, the plunger 51 begins to build up pressure on the lower end of the fruit. When the pressure reaches the value at which the regulator 104 is set, the gate 75 will start to open to permit the discharge of the residue in the lower end of the plunger. Further, the gate will maintain the desired pressure on the lower end of the column of residue so that the finishing pressure generated by the plunger will be maintained.

When the upper cup 37 is raised, the pressure on the fruit is released and the spongy or springy material in the upper end of the plunger has a tendency to move upwardly out of the upper end of the plunger. However, the three inwardly projecting arms 115 of the split ring prevent this upward movement of the material. Accordingly, no residue or the like is permitted to project out of the plunger in position to interfere with the operation of the apparatus during the next fruit-squeezing cycle.

It will be understood that modifications and variations may be effected without departing from the scope of the present invention which is limited only by the scope and proper interpretation of the appended claims.

Having thus described the invention, what is claimed as new and desired to be protected by Letters Patent is:

1. Fruit processing apparatus for applying pressure to a fruit to squeeze it and for extracting the juice therefrom, said apparatus comprising pressure-applying means which includes cooperating cups and a tubular plunger, said plunger having an open inlet end mounted for communication with the interior of said fruit and a discharge end opposite to and in communication with said inlet end for discharge of the fruit residue after the extraction of the juice and a gate movable from a position closing the discharge end of said plunger to a position spaced from said discharge end, a fluid-actuated pressure-applying system connected to said gate for maintaining a predetermined maximum pressure on the fruit pulp at the interior of said fruit during the juice extracting process, and control means for selectively varying the fluid pressure in said system to vary said predetermined maximum pressure.

2. Fruit processing apparatus according to claim 1 wherein said pressure control means is a pressure-regulator valve disposed in the pressure-applying system.

3. Fruit processing apparatus according to claim 2 including a plurality of material-intercepting arms projecting radially inwardly at the inlet end of said tubular plunger to prevent movement of said fruit residue out of said plunger.

4. Fruit processing apparatus according to claim 1 wherein said fluid-actuated pressure-applying system includes a pair of power cylinders pivotally mounted at one end on said plunger and having piston rods operatively connected to said gate.

5. Fruit processing apparatus for applying pressure to a fruit and extracting the juice therefrom, said apparatus comprising upper and lower fruit-receiving cups arranged to move into interdigitating relation to squeeze a fruit therebetween, means defining an opening in the lower end of said lower cup through which juice and pulp is ejected during the squeezing of the fruit, a perforated tube projecting upwardly toward said cups and communicating with the opening in said lower cup, a tubular plunger slidable in said tube toward said lower cup to apply pressure to the fruit as it is being squeezed, said plunger having a discharge passage therethrough for the discharge of the fruit residue after extraction of the juice therefrom, and means for applying a predetermined maximum amount of pressure to the interior of said fruit during the juice extracting process, said last named means including a closure member movable to a position closing the end of said plunger that is remote from said lower cup, a fluid-actuated pressure-applying system connected to said closure member to resist movement of said plate away from said plunger end, and control means for selectively varying the pressure of the fluid in said system.

6. Fruit processing apparatus for extracting juice from a fruit, said apparatus comprising means for applying pressure about the exterior surface of the fruit, a tubular pressure-applying member mounted for communication with the interior of said fruit, said pressure-applying member having an inlet end and a discharge end connected by a passage for the discharge of fruit residue after the extraction of the juice therefrom, movable closure means for said discharge end to apply pressure through the fruit residue in said passage to the fruit pulp at the interior of said fruit, and means for controlling the movement of said closure means to maintain a predetermined maximum pressure upon said fruit during the juice extracting process.

7. Fruit processing apparatus according to claim 6 wherein said last named means comprises a pressure applying system operatively connected to said closure means, and means for regulating said system to predetermine the pressure exerted upon said closure means.

8. Fruit processing apparatus according to claim 6 including a plurality of material-intercepting arms projecting radially inwardly at the inlet end of said tubular member, said arms having sharpened edges facing said fruit and opposite edges of flattened shape to prevent movement of said fruit residue out of said member.

9. Fruit processing apparatus for extracting juice from a fruit, said apparatus comprising means for applying pressure about the exterior surface of the fruit, a perforated tube mounted for penetration into said fruit, a tubular plunger slidable in said tube for applying pressure to the interior of said fruit while it is being squeezed and causing the juice to be expelled through the perforations in said tube, said plunger having an inlet end for receiving fruit residue and a discharge passage therethrough for the discharge of the fruit residue after extraction of the juice therefrom, movable closure means for blocking said discharge passage to apply pressure through the fruit residue in said passage to the fruit pulp within said fruit, and means for controlling the movement of said closure means to maintain a predetermined maximum pressure upon said fruit during the juice extracting process.

10. Fruit processing apparatus according to claim 9 wherein said last named means comprises a pressure applying system operatively connected to said closure means, and means for regulating said system to predetermine the pressure exerted upon said closure means.

11. Fruit processing apparatus according to claim 9 including a plurality of material-intercepting arms projecting radially inwardly at the inlet end of said tubular plunger, said arms having sharpened edges facing said fruit and opposite edges of flattened shape to prevent movement of said fruit residue out of said plunger.

References Cited

UNITED STATES PATENTS

| 1,911,687 | 5/1933 | Hafley | 100—127 |
| 2,422,895 | 6/1947 | Habenicht | 100—127 X |
| 2,540,345 | 2/1951 | Pipkin | 100—37 X |
| 2,649,730 | 8/1953 | Hait | 100—213 X |
| 2,697,978 | 12/1954 | MacIlwaine | 100—127 X |
| 2,846,943 | 8/1958 | Belk | 100—108 |
| 3,185,071 | 5/1965 | Foss et al. | 100—116 X |
| 3,236,175 | 2/1966 | Belk | 100—213 X |

FOREIGN PATENTS

| 477,432 | 7/1915 | France. |
| 715,033 | 9/1931 | France. |

LOUIS O. MAASSEL, *Primary Examiner.*

UNITED STATES PATENT OFFICE
CERTIFICATE OF CORRECTION

Patent No. 3,429,257

February 25, 1969

Wilber C. Belk

It is certified that error appears in the above identified patent and that said Letters Patent are hereby corrected as shown below:

Column 1, line 50, "compound" should read -- control --. Column 3, line 73, "30-70" should read -- 30-75 --.

Signed and sealed this 14th day of April 1970.

(SEAL)
Attest:

Edward M. Fletcher, Jr.
Attesting Officer

WILLIAM E. SCHUYLER, JR.
Commissioner of Patents